United States Patent [19]

Manschitz

[11] Patent Number: 5,009,440

[45] Date of Patent: Apr. 23, 1991

[54] TOOL CHUCK FOR TOOL BITS

[75] Inventor: Erwin Manschitz, Germering, Fed. Rep. of Germany

[73] Assignee: Hilti Aktiengesellschaft

[21] Appl. No.: 198,046

[22] Filed: May 24, 1988

[30] Foreign Application Priority Data

May 25, 1987 [DE] Fed. Rep. of Germany ....... 3717614

[51] Int. Cl.[5] ........................ B23B 31/10

[52] U.S. Cl. ........................ 279/71; 279/81; 279/19.3

[58] Field of Search ........................ 279/19, 19.3, 19.4, 279/19.5, 19.6, 81, 74–80, 1 A, 19.2, 19.7, 72, 71, 73, 66, 1 B; 408/226, 239 R, 240, 239 A; 409/232, 234; 62/160; 173/47, 48, 29

[56] References Cited

U.S. PATENT DOCUMENTS 4,691,929 9/1987 Neumaier et al. ................ 279/19.3

*Primary Examiner*—Z. R. Bilinsky
*Assistant Examiner*—Robert Schultz
*Attorney, Agent, or Firm*—Toren, McGeady & Associates

[57] ABSTRACT

A tool chuck for holding axially extending the shank end of a tool bit includes a guide tube with an adapter sleeve encircling and being rotatable relative to the guide tube for securing holding segments in engagement with the tool bit. The holding segments are U-shaped in section transverse to the axial direction of the guide tube. Each U-shaped holding segment has a pair of inwardly directed legs engageable within grooves in the shank end of the inserted tool bit. One of the legs forms a locking element while the other acts as an entrainment strip. By turning the adapter sleeve around the guide tube, either the entire holding segment or only the entrainment strip can be displaced radially outwardly out of contact with the shank end of the tool bit. The adapter sleeve has displacement recesses in its inner surface facing the outer surface of the holding segments for receiving the holding segment in the outwardly displaced condition. The position of the holding segments is controlled by a circumferentially extending inner surface of the adapter sleeve in engagement with a circumferentially extending outer surface of the holding sgements. Detents in the guide tube receive a ball biased inwardly by an annular spring for securing the adapter sleeve in different rotational positions.

7 Claims, 1 Drawing Sheet

TOOL CHUCK FOR TOOL BITS

BACKGROUND OF THE INVENTION

The present invention is directed to a tool chuck for holding the shank ends of tool bits in which at least one axially extending groove is located with the groove closed at the ends spaced apart in the axial direction. The tool chuck has a locking element as well as an entrainment strip for engagement within the groove. The locking element and entrainment strip are mounted in and are radially displaceable relative to a guide tube by an axially or rotatably adjustable adapter sleeve.

Tool bits for manually operated hammer drills and the like are known which have only axially extending groves closed in the axial direction. In the tool chuck disclosed in DE-OS 1 652 684, cylindrically shaped locking elements are provided in the chuck for engagement into closed ended axially extending grooves in the tool bit. Such locking elements serve to transmit torque from the tool chuck to the inserted end of the tool bit and also for axial retention of the tool bit in the tool chuck.

Further, in DE-OS 2 551 125 there are known tool bits with the insertion shank end formed with closed ended axially extending grooves and with axially extending grooves open at the trailing end. Locking elements engage in the closed ended grooves while entrainment strips engage into the grooves open at the trailing end with the locking elements and the entrainment strips positioned in the tool chuck. The locking elements serve only for axial retention of the tool bit with the transmission of rotary motion taking place via the entrainment strips.

Users of hammer drills and similar tools face the disadvantage in these different types of chucks in that the tool bit with an insertion shank end compatible with one type of chuck can only have limited use in tool chucks of the other type. While tool bits with closed ended axially extending grooves and axially extending grooves open at the trailing end can be used in tool chucks containing only locking elements, tool bits with only closed ended axially extending grooves cannot be utilized in most tool chucks containing both locking elements and entrainment strips.

SUMMARY OF THE INVENTION

Therefore, the primary object of the present invention is to provide a tool chuck with both radially displaceable locking elements and entrainment strips suitable for receiving the shank end of tool bits containing both closed ended axially extending grooves and axially extending grooves with open trailing ends, as well as tool bits containing only closed ended axially extending grooves.

In accordance with the present invention, a locking element and an entrainment strip are incorporated into a holding segment and the segment is positioned in a through opening in a guide tube so that it can be displaced in a radial direction. By interconnecting the locking elements and the entrainment strips in the holding segments, the locking elements and entrainment strips can be displaced radially inwardly of the guide tube either together or one after the other. Serial shifting of the locking elements and the entrainment strips can be effected by making the holding segment pivotable about a pivot axis extending parallel to the axis of the tool chuck.

Preferably, the holding segment is generally U-shaped in cross-section transversely of the axis of the tool chuck. A locking element forms one leg of the U-shaped cross-section while an entrainment strip forms the other leg, with the two legs interconnected by means of a circumferentially extending web. The U-shaped cross-section can remain uniform over the axial length of the holding segment so that rolled or extruded sections can be used for forming the holding segments.

The radially outer surface of the holding segment is advantageously formed as a control cam or surface and this outer surface cooperates with displacement recesses formed in the inside surface of an adapter sleeve for permitting the radially outward displacement of the holding segment. With the holding segment shifted radially outwardly into the displacement recess, the shank end of a tool bit can be inserted into the guide tube. This unlocked condition of the tool chuck is achieved by rotating or axially displacing the adapter sleeve relative to the guide tube. The inside surface of the adapter sleeve slopes inwardly in the circumferential direction from adjacent the displacement recess to the smallest inside diameter of the adapter sleeve. This inwardly converging surface of the adapter sleeve acts as a control cam or surface when the adapter sleeve is turned or rotated relative to the guide tube. The control cam or surface displaces the locking element and entrainment strip formed in the holding segment into the radially inwardly displaced position. Preferably, such displacement takes place initially with the locking element moved inwardly and only after the complete inward movement of the locking elements, then the entrainment strip is shifted radially inwardly through the opening in the guide tube. The inward displacement occurs preferably over approximately half of the circumferential dimension of the displacement recesses. With a correspondingly small slope of the control cam or surface, the holding segment can be displaced radially inwardly by the adapter sleeve without any large exertion of force.

The inwardly directed surface of one leg of the U-shaped holding segment in the radially inwardly displaced position has flanks extending generally radially. Such radially extending flanks afford effective transmission of torque from the tool chuck to the inserted shank end of the tool bit. Furthermore, radially extending flanks afford a favorable cross-sectional shape of the corresponding axially extending groove in the shank end of the tool bit and of the entrainment strip engaging into the groove.

The inwardly facing surface of the other leg of the U-shaped holding segment has a surface formed like the outside surface of a cylinder. The cylindrically shaped outer surface in cooperation with a correspondingly shaped concave groove in the shank end of the tool bit combine to form a pivot bearing around which the holding segment can be pivoted. A cylindrically shaped surface permits the use of customary tool bits with axially extending grooves which are concave in transverse cross-section and are economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
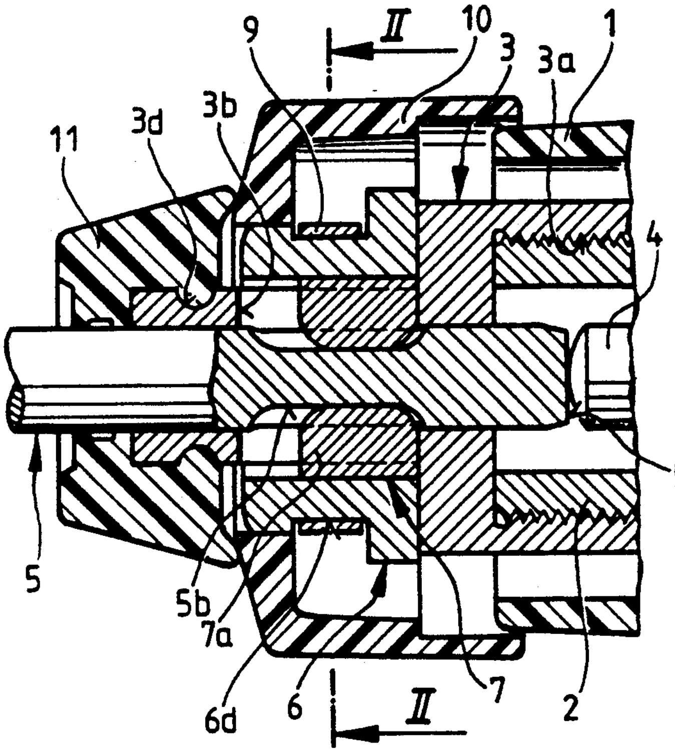
FIG. 1 is a partially axially extending section displaying the leading end of a tool chuck embodying the present invention and taken along the lines I—I in FIG. 2.
Figure 2:
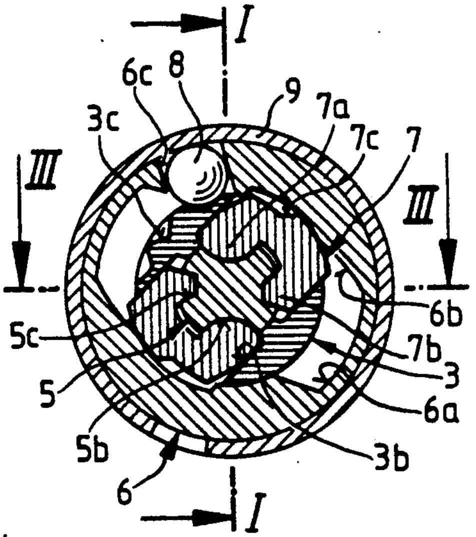
FIG. 2 is a cross-sectional view of the tool bit chuck shown in FIG. 1 taken along the liens II—II in FIG. 1, with the chuck in the locked position, however, the adapter sleeve shown in FIG. 1 is not illustrated in FIG. 2.
Figure 3:
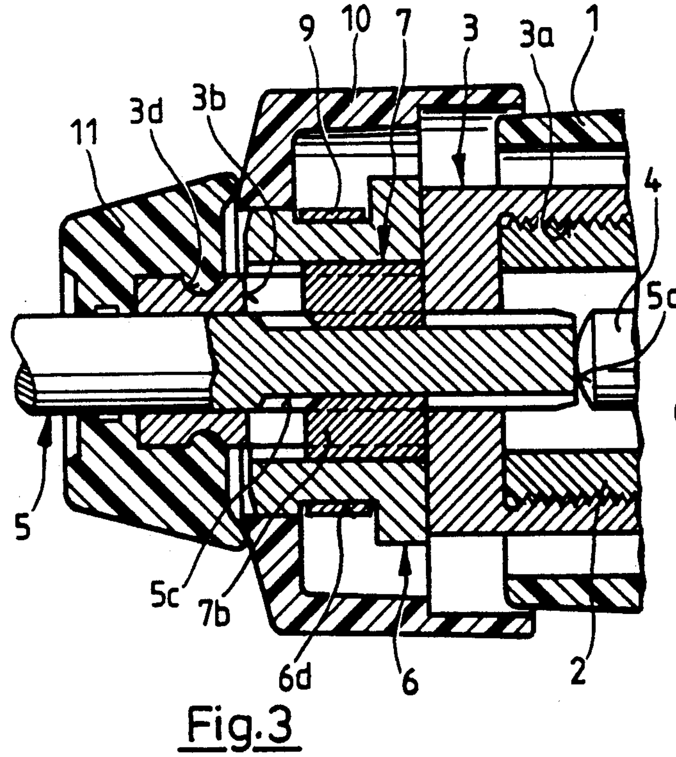
FIG. 3 is an axially extending sectional view, similar to FIG. 1, however, taken along the lines III—III in FIG. 2.

In FIGS. 1 go 5, a tool chuck embodying the present invention is shown mounted on a drilling device including a housing 1 and a cylinder 2 rotatably supported within the housing. An axially extending guide tube 3 is located within the housing 1, laterally enclosing the cylinder 2, and extending from the cylinder 2 in the axial direction. As viewed in FIG. 1, the left-hand end is the leading end of the chuck and of the parts forming the chuck. The guide tube 3 is connected to the cylinder 2 by an internal thread 3*a*. Within the cylinder 2, there is an axially displaceable striker member 4. A tool bit 5 is shown with its shank or trailing end inserted into the chuck passing inwardly through the leading end of the guide tube 3 into the leading end of the cylinder 2. The trailing end face 5*a* of the tool bit 5, is contacted by the striker member 4 for imparting an axially directed force to the tool bit. Encircling the guide tube 3, adjacent to its leading end, is an adapter sleeve 6 which is rotatably supported on the guide tube 3, that is, the adapter sleeve can be turned relative and about the axis of the guide tube 3. In the axially extending region of the adapter sleeve 6, the guide tube 3 has two openings 3*b*, extending between its inside and outside surfaces. A holding segment is located in each of the through openings 3*b*. The holding segments 7 have a generally U-shaped configuration in section viewed transversely of the axis of the guide tube 3. The U-shaped holding segments 7 have a pair of inwardly directed legs interconnected by a web. One leg of each holding segment 7 is a locking element 7*a*, and the other leg is an entrainment strip 7*b*. As shown in FIGS. 1 to 3, the locking elements 7*a* and entrainment strips 7*b* engage in correspondingly axially extending grooves 5*b*, 5*c*, in the tool bit affording a positive locking action. Axially extending grooves 5*b* are closed at the ends spaced apart in the axial direction, while the other axially extending grooves 5*c* are open at the trailing end of the grooves located at the trailing end face 5*a* of the tool bit 5. The adapter sleeve 6 has displacement recesses 6*a* in its radially inner surface with the recesses arranged to receive the holding segments 7 when the segments are displaced radially outwardly if the adapter sleeve 6 is in an appropriate circumferential position. In FIG. 5, the holding segments are shown displaced radially outwardly of the bore within the guide tube into which the shank end of the tool bit is inserted. The radially outer surface of the holding segments 7 includes a circumferentially extending control cam or surface 7*c* which co-acts with a circumferentially extending inner surface 6*b* of the adapter sleeve 6 extending circumferentially from the adjacent displacement recess 6*a*. Each inner surface 6*b* extends in the circumferential direction inwardly from the displacement recess 6*a* to the minimum inside diameter of the adapter sleeve 6. Adapter sleeve 6 has a radially extending bore 6*c* extending between its radially inner and outer surfaces. A ball 8 is radially displaceable within the bore 6*c*. Ball 8 is biased radially inwardly by an annular spring 9 located in an annular groove 6*d* in the outer surface of the adapter sleeve 6. On the radially outer surface of the guide tube 3, there are three detent recesses 3*c*, spaced apart in the circumferential direction for receiving the ball 8 in three different rotational positions, note FIGS. 2, 4 and 5. As can be seen in FIGS. 1 and 3, an actuation sleeve 10 encircles and is in contact adjacent its leading end with the outer surface of the adapter sleeve 6 for turning the adapter sleeve relative to the guide tube 3. At the leading end of the chuck, a dust protection cap 11 formed of a rubber elastic material is seated within a recess 3*d* in the outer surface of the guide tube 3. Further, the trailing end of the cap 11 secure the adapter sleeve 6 and the actuation sleeve 10 against axial displacement. Moreover, the dust protection cap 11 prevents entry of drilled material into the tool chuck.

In FIG. 1, the holding segments 7 are displaced completely inwardly and are locked in this position by the adapter sleeve 6. Locking elements 7*a* on the holding segments 7 secure the tool bit 5 against axial displacement out of the chuck, while the entrainment strips 7*b* transmit torque from the guide tube 3 to the tool bit 5.

In the position of the adapter sleeve 6 displayed in FIG. 5, the holding segments 7 have shifted radially outwardly out of the bore in the guide tube 3, into the displacement recesses 6*a*, in the inner surface of the adapter sleeve 6. In this position, the tool bit can be replaced in the guide tube 3.

Figure 4:
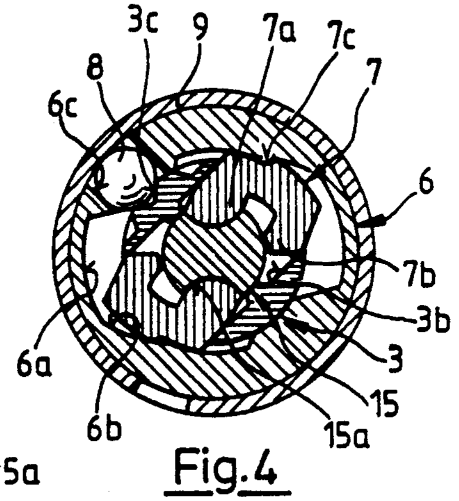
FIG. 4 is cross-sectional view similar to FIG. 2, illustrating the chuck in the partially unlocked position, but with a different shaped tool bit shank.
Figure 5:
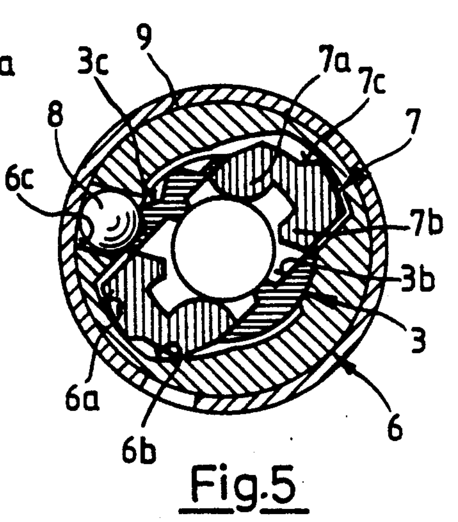
FIG. 5 is another transverse cross-section of the tool chuck as shown in FIG. 2, but illustrated in the completely unlocked position.

In FIG. 4, a different tool bit 15 is shown inserted into the tool chuck. Tool bit 15 differs from tool bit 5 illustrated in FIGS. 1 to 3 in that it has only two axially extending grooves 15*a* closed at their ends spaced apart in the axial direction. Adapter sleeve 6 is shown in a middle position with the locking elements 7*a* displaced radially inwardly into the axially grooves 15*a* of the tool bit 15, however, the entrainment strips 7*b* remain in the radially outer position bearing against the outside surface of the bit 15. During displacement of the holding segments 7, it undergoes a pivoting movement about a pivot axis extending parallel to the axis of the tool chuck. By the co-action of the inner surface 6*b* of the adapter sleeve 6 with the outer control cam or surface 7*c*, the holding segments 7 are locked in this position. From the position shown in FIG. 4, by turning the adapter sleeve counterclockwise relative to the holding segments 7, the adapter sleeve reaches the position shown in FIG. 5 so that the holding segments 7 can be displaced radially outwardly, each into one of the displacement recesses 6*a*, whereby a tool bit 15 can be removed and replaced.

While specific embodiments of the invention have been shown and described in detail to illustrate the application of the inventive principles, it will be understood that the invention may be embodies otherwise without departing from such principles.

I claim:

1. A tool chuck for holding a tool with an axially extending shank end having at least one axially extending groove thereon, said at least one axially extending groove having closed opposite ends, said tool chuck comprising an axially extending guide tube having an inside surface and an outside surface, an adapter sleeve enclosing at least an axially extending part of said guide tube and being rotatable relative to said guide tube about the axis thereof, and locking elements and entrainment strips mounted for rotation with the guide tube and for selective displacement radially inwardly by said adapter sleeve into at least one groove of the tool, wherein the improvement comprises a holding segment with one said locking element and one said entrainment strip thereon spaced apart in the circumferential direction of said adapter sleeve and the mounting of said holding segment with said one locking element and said one entrainment strip comprising a through opening extending between the inside surface and the outside surface of said guide tube, said holding segment being radially displaceable through said through opening by said adapter sleeve and said adapter sleeve arranged and adapted for selective radially inward displacement of said locking element or both of said locking element and entrainment strip of said holding segment.

2. A tool chuck, as set forth in claim 1, wherein said holding segment has a generally U-shaped cross-section extending transversely of the axial direction of said guide tube and said U-shaped cross-section having a web extending circumferentially and a pair of legs extending inwardly from said web toward the axis of said guide tube and spaced apart in the circumferential direction of the said adapter sleeve with one said leg comprising said locking 3. Tool chuck, as set forth in claim 2, wherein said holding segment has a radially outwardly directed surface extending in the circumferential direction of said guide tube forming a control cam, and said adapter sleeve has a radially inner surface including a displacement recess and a circumferentially extending inner surface extending from the displacement recess in the circumferential direction co-acting with said control cam on said holding segment so that with said displacement recess aligned opposite said control cam, said holding segment can be displaced radially outwardly into said displacement recess.

4. Tool chuck, as set forth in claim 3, wherein said inner surface of said adapter sleeve extending circumferentially from said displacement recess slopes inwardly from said displacement recess to a minimum inner diameter of said adapter sleeve.

5. Tool chuck, as set forth in claim 2, wherein said entrainment element of said holding segment has generally radially extending flanks thereon adapted to fit into a correspondingly shaped groove in the shank of the tool for effective transmission of torque from the tool chuck to the tool.

6. Tool chuck, as set forth in claim 5, wherein a radially inner surface of said locking element of said holding segment comprises a convexly arched surface.

7. Tool chuck, as set forth in claim 6, wherein said adapter sleeve has a radially extending bore therethrough extending between the inner and the otter surfaces thereof, a ball located within said bore, an annular spring encircling the outer surface of said adapted sleeve and biasing said ball radially inwardly, and said guide tube having a plurality of circumferentially spaced detent bores therein arranged to receive said ball in different rotational positions of said adapter sleeve relative to said guide tube.

* * * * *